(12) United States Patent
Cho

(10) Patent No.: US 11,947,107 B2
(45) Date of Patent: Apr. 2, 2024

(54) METHOD AND DEVICE FOR RECOVERING IMAGE PASSING THROUGH DISPLAY

(71) Applicant: GUANGDONG OPPO MOBILE TELECOMMUNICATIONS CORP., LTD., Guangdong (CN)

(72) Inventor: Hirotake Cho, Kanagawa-Ken (JP)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 605 days.

(21) Appl. No.: 17/204,124

(22) Filed: Mar. 17, 2021

(65) Prior Publication Data
US 2021/0199952 A1 Jul. 1, 2021

Related U.S. Application Data

(63) Continuation of application No. PCT/CN2018/107739, filed on Sep. 26, 2018.

(51) Int. Cl.
*G02B 27/00* (2006.01)
*G02B 5/20* (2006.01)
*G02B 13/24* (2006.01)
*G06T 5/00* (2006.01)
*G06T 5/20* (2006.01)

(52) U.S. Cl.
CPC .......... *G02B 27/005* (2013.01); *G02B 5/208* (2013.01); *G02B 13/24* (2013.01); *G06T 5/002* (2013.01); *G06T 5/20* (2013.01)

(58) Field of Classification Search
None
See application file for complete search history.

(56) References Cited

U.S. PATENT DOCUMENTS

| 4,928,301 | A  | 5/1990  | Smoot          |
| 9,013,613 | B2 | 4/2015  | Ogita et al.   |
| 9,736,383 | B2 | 8/2017  | Evans, V et al.|
| 9,823,694 | B2 | 11/2017 | Evans, V et al.|
| 9,864,400 | B2 | 1/2018  | Evans, V et al.|
| 9,870,024 | B2 | 1/2018  | Evans, V et al.|

(Continued)

FOREIGN PATENT DOCUMENTS

| CN | 101662566 A | 3/2010 |
| CN | 102687500 A | 9/2012 |

(Continued)

OTHER PUBLICATIONS

SR for PCT application PCT/CN2018/107739 dated Jun. 28, 2019.

(Continued)

*Primary Examiner* — Bao-Luan Q Le
*Assistant Examiner* — Danell L Owens
(74) *Attorney, Agent, or Firm* — Young Basile Hanlon & MacFarlane, P.C.

(57) ABSTRACT

A method for recovering an image passing through a display and taken by an image sensor disposed on a rear side of the display, the method includes acquiring the image taken by the image sensor, obtaining a plurality of point spread functions corresponding one-to-one to a plurality of dots arranged in a predetermined pattern on a calibration chart, and recovering the image by performing a de-convolution of the image based on the plurality of point spread functions.

20 Claims, 13 Drawing Sheets

(56) References Cited

U.S. PATENT DOCUMENTS

| | | |
|---|---|---|
| 2007/0002130 A1 | 1/2007 | Hartkop |
| 2009/0102763 A1 | 4/2009 | Border et al. |
| 2011/0199497 A1* | 8/2011 | Motta .................. H04N 13/366 |
| | | 348/E5.024 |
| 2014/0118559 A1 | 5/2014 | Maglaque |

FOREIGN PATENT DOCUMENTS

| | | |
|---|---|---|
| CN | 104363369 A | 2/2015 |
| CN | 104704807 A | 6/2015 |
| CN | 106134177 A | 11/2016 |
| CN | 107852456 A | 3/2018 |
| CN | 108364967 A | 8/2018 |
| CN | 108365122 A | 8/2018 |
| CN | 108366186 A | 8/2018 |
| CN | 108418928 A | 8/2018 |
| EP | 2860694 A2 | 4/2015 |
| WO | 2017195487 A1 | 11/2017 |
| WO | 2018012719 A1 | 1/2018 |

OTHER PUBLICATIONS

Chinese Office Action with English Translation for CN Application 201880096437.6 dated Feb. 16, 2022. (9 pages).
Extended European Search Report for EP Application 18935935.9 dated Aug. 6, 2021. (9 pages).
Mosleh et al., Camera Intrinsic Blur Kernel Estimation: A Reliable Framework, XP-32793955A, 4961-4968.
Chinese Second Office Action with English Translation for CN Application 201880096437.6, dated Jun. 20, 2022. (10 pages).

\* cited by examiner

METHOD AND DEVICE FOR RECOVERING IMAGE PASSING THROUGH DISPLAY

CROSS-REFERENCE TO RELATED APPLICATION(S)

This application is a continuation application of International Application No. PCT/CN2018/10739, filed on Sep. 26, 2018, the entire contents of which are incorporated herein by reference.

TECHNICAL FIELD

The present disclosure relates to generally the electronic technology field, and more particularly, to a method and a device for recovering an image which passes through a display and is taken by an image sensor disposed on a rear side of the display.

BACKGROUND

A transparent display for an electronic device such as a smartphone and a tablet terminal has been developed. A display area of the electronic device can be wider by placing a front-facing camera behind the transparent display, thereby realizing a true "all-display" desirable for immersive viewing experience without sacrificing user value.

However, a light passing through the display is influenced by optical characteristics of the display. Therefore, if pictures/images are taken by the camera disposed behind the display, quality of the image will be degraded due to the optical disturbance caused by the display.

The disturbance is mainly due to reflection at the display or diffraction by a wiring structure of the display. Particularly, the diffraction causes severe ugly artifact (blurring, flare etc.) on the image captured by the camera and now there is no effective solutions to resolve this problem.

SUMMARY

According to one aspect of the disclosure, a method for recovering an image passing through a display and taken by an image sensor disposed on a rear side of the display is provided, including: acquiring the image taken by the image sensor; obtaining a plurality of point spread functions corresponding one-to-one to a plurality of dots arranged in a predetermined pattern on a calibration chart; and recovering the image by performing a de-convolution of the image based on the plurality of point spread functions.

According to another aspect of the disclosure, an electronic device is provided, including: a display; an image sensor disposed on a rear side of the display; a processor; and a memory, wherein the processor is configured to recover an image which passes through the display and taken by the image sensor by performing acts of: acquiring the image taken by the image sensor; obtaining a plurality of point spread functions corresponding one-to-one to a plurality of dots arranged in a predetermined pattern on a calibration chart; and recovering the image by performing a de-convolution of the image based on the plurality of point spread functions.

BRIEF DESCRIPTION OF DRAWINGS

These and/or other aspects and advantages of embodiments of the present disclosure will become apparent and more readily appreciated from the following descriptions made with reference to the drawings, in which:

FIG. 1b is a cross-sectional diagram of the electronic device as shown in FIG. 1a.

DETAILED DESCRIPTION

Figure 1A:
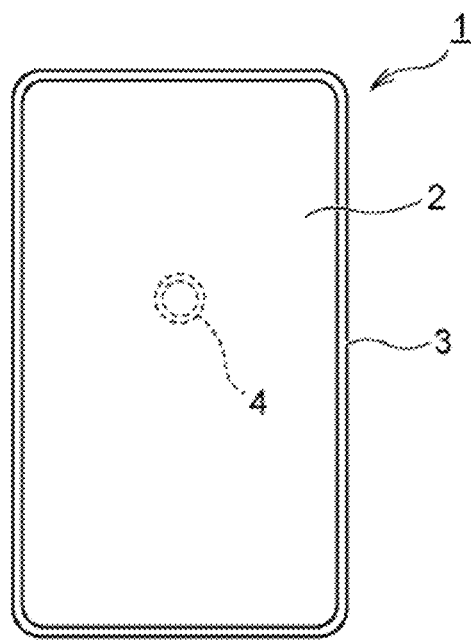
FIG. 1a is a plan view of an electronic device in the present disclosure.

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

<Electronic Device>

First, a schematic configuration of an electronic device in the present disclosure is described with reference to FIG. 1a to FIG. 3.

Figure 1B:
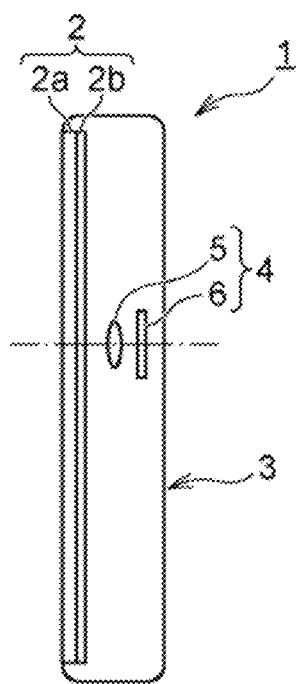
Figure 1C:
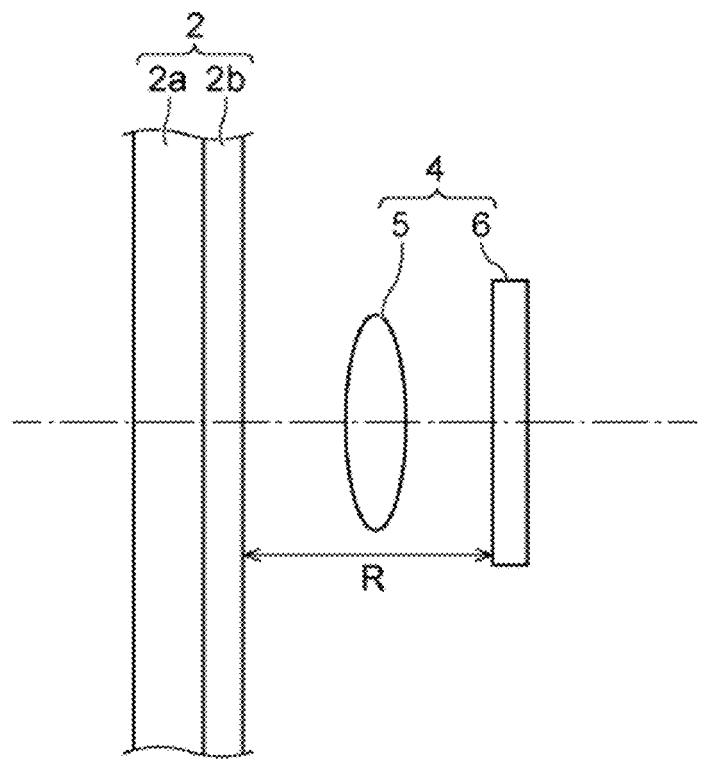
FIG. 1c is an enlarged cross-sectional view centered on a camera assembly of the electronic device as shown in FIG. 1b.
Figure 2:
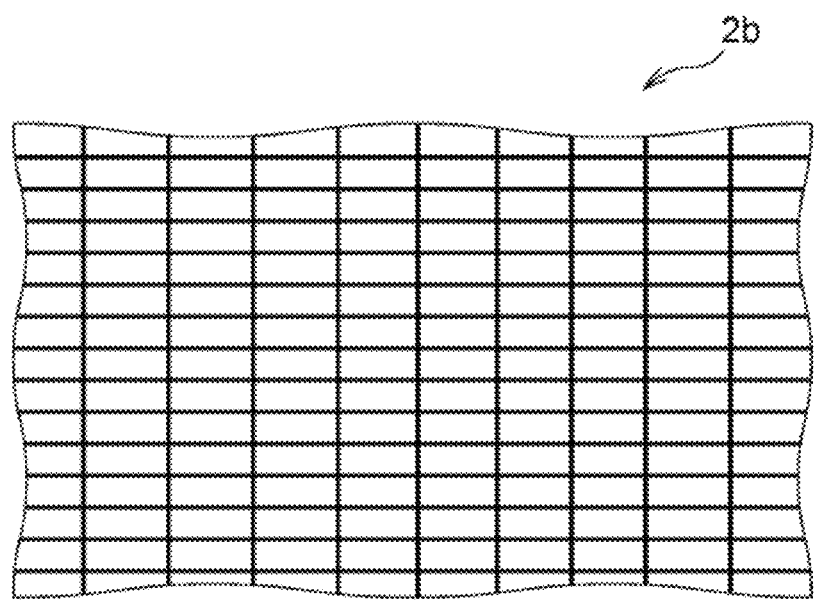
FIG. 2 is a schematic plan view of a wiring structure of a transparent display of the electronic device as shown in FIGS. 1a and 1b.
Figure 3:
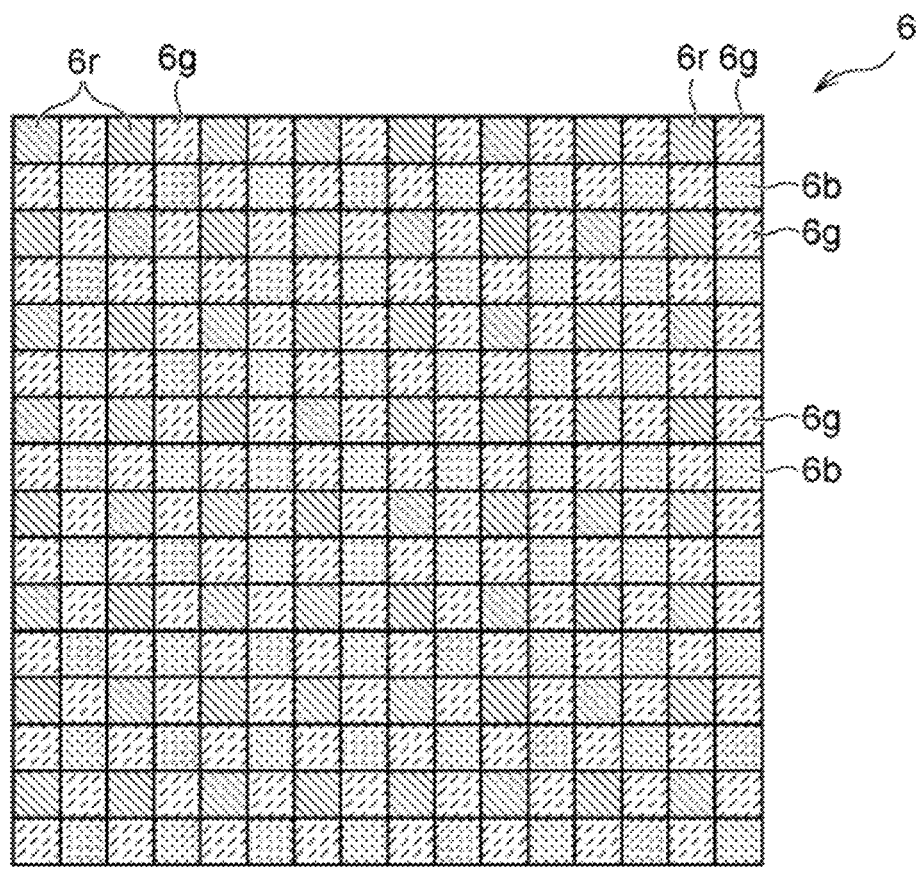
FIG. 3 is a plan view of a part of an image sensor of a camera assembly of the electronic device as shown in FIGS. 1a and 1b.

FIG. 1a is a plan view of an electronic device in the present disclosure. FIG. 1b is a cross-sectional diagram of the electronic device as shown in FIG. 1a. FIG. 1c is an enlarged cross-sectional view centered on a camera assembly of the electronic device as shown in FIG. 1b. FIG. 2 is a schematic plan view of a wiring structure of a transparent display of the electronic device as shown in FIGS. 1a and 1b. FIG. 3 is a plan view of an image sensor of a camera assembly of the electronic device as shown in FIGS. 1a and 1b.

The electronic device 1 is a smartphone as shown in FIGS. 1a and 1b. The electronic device 1 may be another mobile device or terminal, such as smartphone, tablet computer, personal digital assistant (PDA), laptop, mobile Internet device (MID) or wearable device. Alternatively, the electronic device 1 may be any apparatus which has a display integrated with camera.

As shown in FIG. 1, the electronic device 1 includes a transparent display 2, a housing 3 and a camera assembly 4.

The transparent display 2 is a transparent display such as an Organic Light Emitting Diode (OLED). The transparent display 2 may be a Liquid Crystal Display (LCD) whose wirings are transparent. It should be noted that the term "transparent" does not mean that transmittance of light is 100%, but means that transmittance of light is more than a required value according to an application.

The transparent display 2 includes a light emitting layer 2a and a wiring structure 2b. In case of OLED, the light emitting layer 2a is an EL (electro-luminescence) layer. The wiring structure 2b has a wire in which a signal of a transistor for controlling the light emitting layer 2a (not shown) flows. The wiring structure 2b may be transparent or opaque. The wiring structure 2b may be in the form of a layer, a multilayer, or a plurality of islands.

The transparent display 2 is a touch panel. The transparent display 2 may be a normal display which is not a touch panel.

As shown in FIG. 2, the wiring structure 2b is formed in a lattice shape. In this case, the wiring structure 2b can be called as "screen grating". The grid size of the wiring structure 2b is 35 um×90 um, for example. Alternatively, the wiring structure 2b may have another planar shape.

Figure 4:
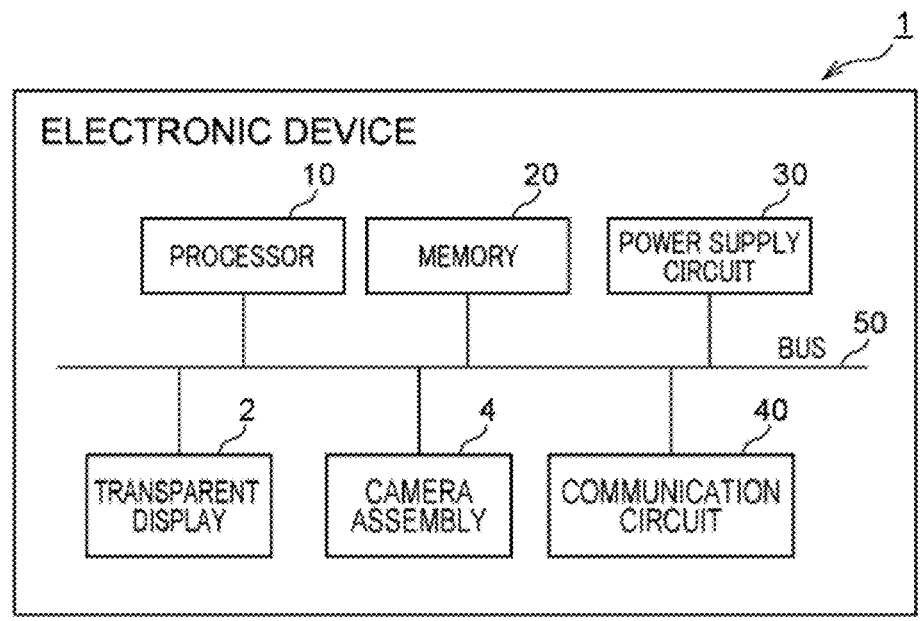
FIG. 4 is a block diagram of the electronic device in the present disclosure.

The housing 3 houses the transparent display 2, the camera assembly and other components illustrated in FIG. 4 such as a processor 10 and a memory 20 etc.

As shown in FIGS. 1a and b, the camera assembly 4 is behind the transparent display 2. The transparent display 2 is true "all-display" without a bezel or a notch for arranging a camera display.

The camera assembly 4 is a front-facing camera. The camera assembly 4 includes an optical system 5 and an image sensor 6. The optical system 5 has a plurality of lens although only one lens is shown in FIGS. 1b and 1c. As shown in FIG. b, the image sensor 6 is disposed on a rear side of the transparent display 2.

The image sensor 6 takes an image which passes through the transparent display 2. As shown in FIG. 3, the image sensor 6 has a plurality of pixels 6r, 6g and 6b, each of which has a photo detector such as a photo-diode and a color filter provided above the photo detector. The color filter of the pixel 6r transmits red light, the color filter of the pixel 6g transmits green light, and the color filter of the pixel 6b transmits blue light.

The image sensor 6 may be a CCD (Charge Coupled Device) image sensor, or may be a CMOS (Complementary Metal-Oxide-Semiconductor Transistor) image sensor, which is not limited in the present disclosure.

A distance R between the transparent display 2 and the image sensor 6, a size of a substantially rectangular opening of the wiring structure 2b, and a wavelength of light passing through the transparent display 2 meet a condition of Fresnel diffraction. The condition is given by the equation (1).

$$R^3 \gg \frac{1}{8\lambda}\left[(x-x')^2 + (y-y')^2\right]^2 \quad (1)$$

Here, R: distance between the transparent display 2 and the image sensor 6, $\lambda$: wavelength of light passing through the transparent display 2, x-x': width of the rectangular opening of the wiring structure 2b, y-y': height of the rectangular opening of the wiring structure 2b.

For example, the distance R is between 0.5 mm and 7.5 mm, a length of one side of the opening (i.e. x-x' and y-y') is between 10 um and 200 um, and the wavelength $\lambda$ is a wavelength of visible light (e.g. 400 nm to 700 nm).

Next, a functional block of the electronic device 1 is described with reference to FIGS. 4 and 5. FIG. 4 is a block diagram of the electronic device 1 in the present disclosure.

As shown in FIG. 4, the electronic device 1 includes the processor 10 such as a CPU or GPU, a memory 20, a power supply circuit 30 and a communication circuit 40 in addition to the already described components (i.e. the transparent display 2 and the camera assembly 4). The above components in the electronic device 1 are connected together via a bus 50.

The processor 10 runs one or more programs stored in the memory 20. The processor 10 implements various applications and data processing of the electronic device 1 by running the programs. The processor 10 may be one or more computer processors. The processor 10 is not limited to one CPU core, but it may have a plurality of CPU cores.

The processor 10 is configured to recover an image which passes through the transparent display 2 and taken by the image sensor 6. The processor 10 may be a main CPU of the electronic device 1, an image processing unit (IPU) or a DSP provided with the camera assembly 4.

The processor 10 turns off the transparent display 2 while the camera assembly 4 is working. In more detail, the processor 10 controls the transparent display 2 not to display anything for at least display area overlapping with the camera assembly 4 while the camera assembly 4 is working.

The memory 20 stores a program to be executed by the processor 10 and various kinds of data. For example, data for estimating a point spread function (i.e. the distance R and a grid size to be described) are stored in the memory 20.

The memory 20 may be a high-speed RAM memory, or a non-volatile memory such as a flash memory and magnetic disk memory.

The power supply circuit 30 has a battery such as a lithium-ion rechargeable battery (not shown) and a battery management unit (BMU) for managing the battery.

The communication circuit 40 is configured to receive and transmit data to communicate with the Internet or other devices via wireless communication. The wireless communication may adopt any communication standard or protocol, including but not limited to GSM (Global System for Mobile communication), CDMA (Code Division Multiple Access), LTE (Long Term Evolution), LTE-Advanced, 5th generation (5G).

The communication circuit 40 may include an antenna and a RF (radio frequency) circuit.

Figure 5:
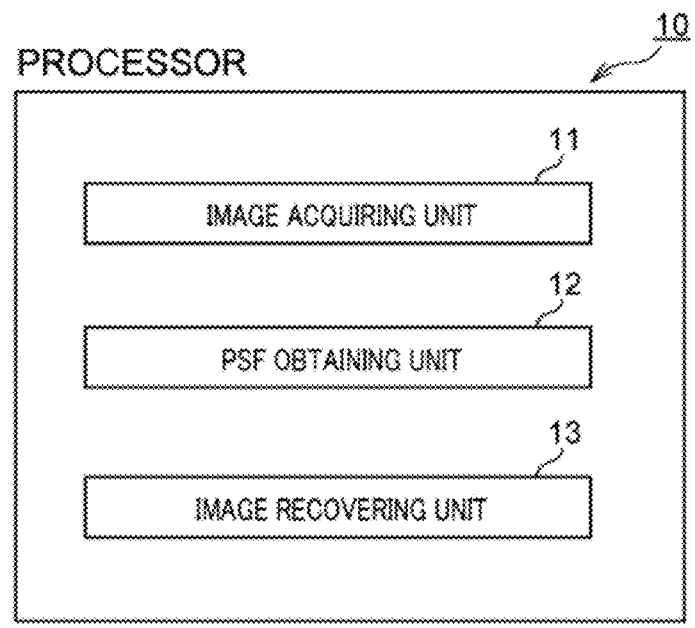
FIG. 5 is a functional block diagram of a processor provided with the electronic device in the present disclosure.

As illustrated in FIG. 5, the processor 10 includes an imaging acquiring unit 11, a PSF obtaining unit 12 and an image recovering unit 13. The imaging acquiring unit 11, the PSF obtaining unit 12 and the image recovering unit 13 may be implemented by software (program) or hardware such as ASIC.

The image acquiring unit 11 is configured to acquire the image taken by the image sensor 6. Specifically, the image acquiring unit 11 receives data of the image taken by the image sensor 6 via bus 50.

The PSF obtaining unit 12 is configured to obtain a PSF sheet data from the memory 20. Here, the PSF sheet data includes a plurality of point spread functions (PSFs). The plurality of PSFs may be different from each other. Each of the PSFs is in a matrix form. Each of the PSFs may be in a function form or in a matrix form. When the PSF is in matrix form, it may be referred to as a PSF matrix in this specification.

Figure 6:
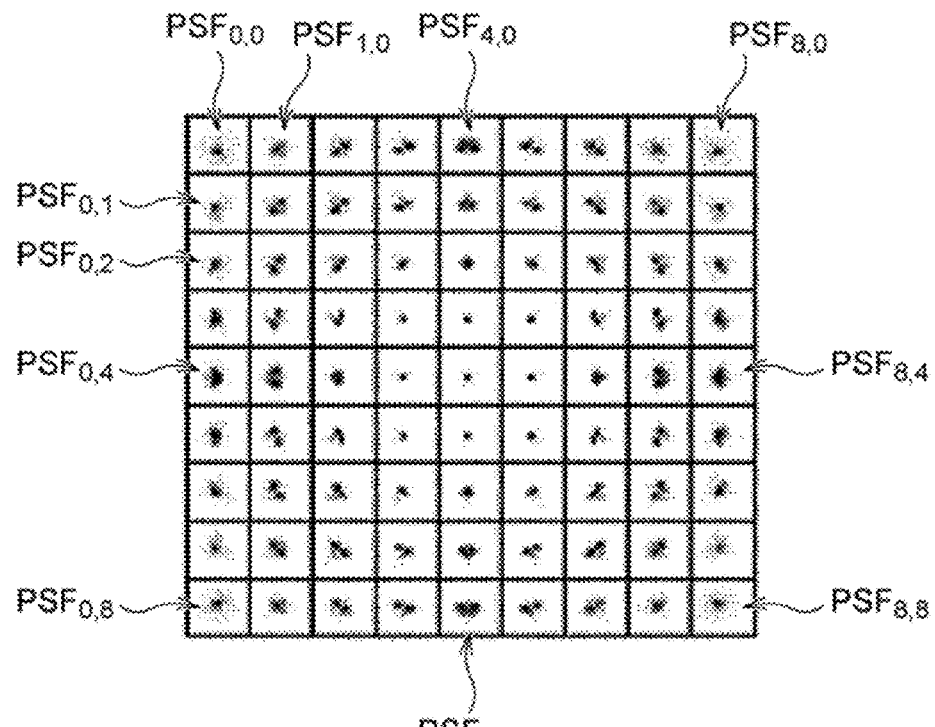
FIG. 6 shows an example of a PSF sheet data.

FIG. 6 shows an example of a PSF sheet data. In this example, a total of 81 PSFs are arranged in a 9×9 grid pattern. One PSF is allocated to one corresponding grid. As shown in FIG. 6, $PSF_{0,0}$ is placed in a grid of the upper left corner, and $PSF_{8,8}$ is placed in a grid of the lower right corner.

Figure 7:
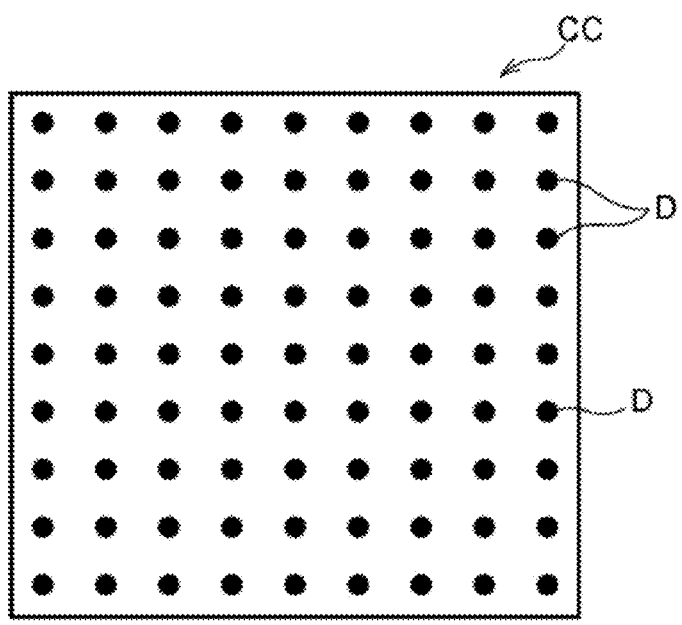
FIG. 7 shows an example of a calibration chart for estimating a plurality of point spread functions.

The plurality of point spread functions correspond to a plurality of dots on a calibration chart in one-to-one correspondence. FIG. 7 shows an example of the calibration chart. In this example, a total of 81 dots D are arranged in a 9×9 grid pattern. An arrangement pattern of the dots D is not limited to this, but the dots D may be arranged in other pattern such as triangular lattice pattern, honey comb pattern etc. That is, the plurality of dots may be arranged in a predetermined pattern.

The image recovering unit 13 is configured to recover the image by performing a de-convolution of the image based on the plurality of PSFs. Specifically, the image recovering unit 13 obtains, for each pixel of the image sensor 6, a PSF matrix corresponding to a pixel of the image sensor based on the plurality of point spread functions, and calculates an inverse matrix for each of the obtained PSF matrices, and convolves the image taken by the image sensor 6 and the inverse matrices. The recovery of the image will be described in detail later.

<Method for Estimating Point Spread Functions>

Figure 8:
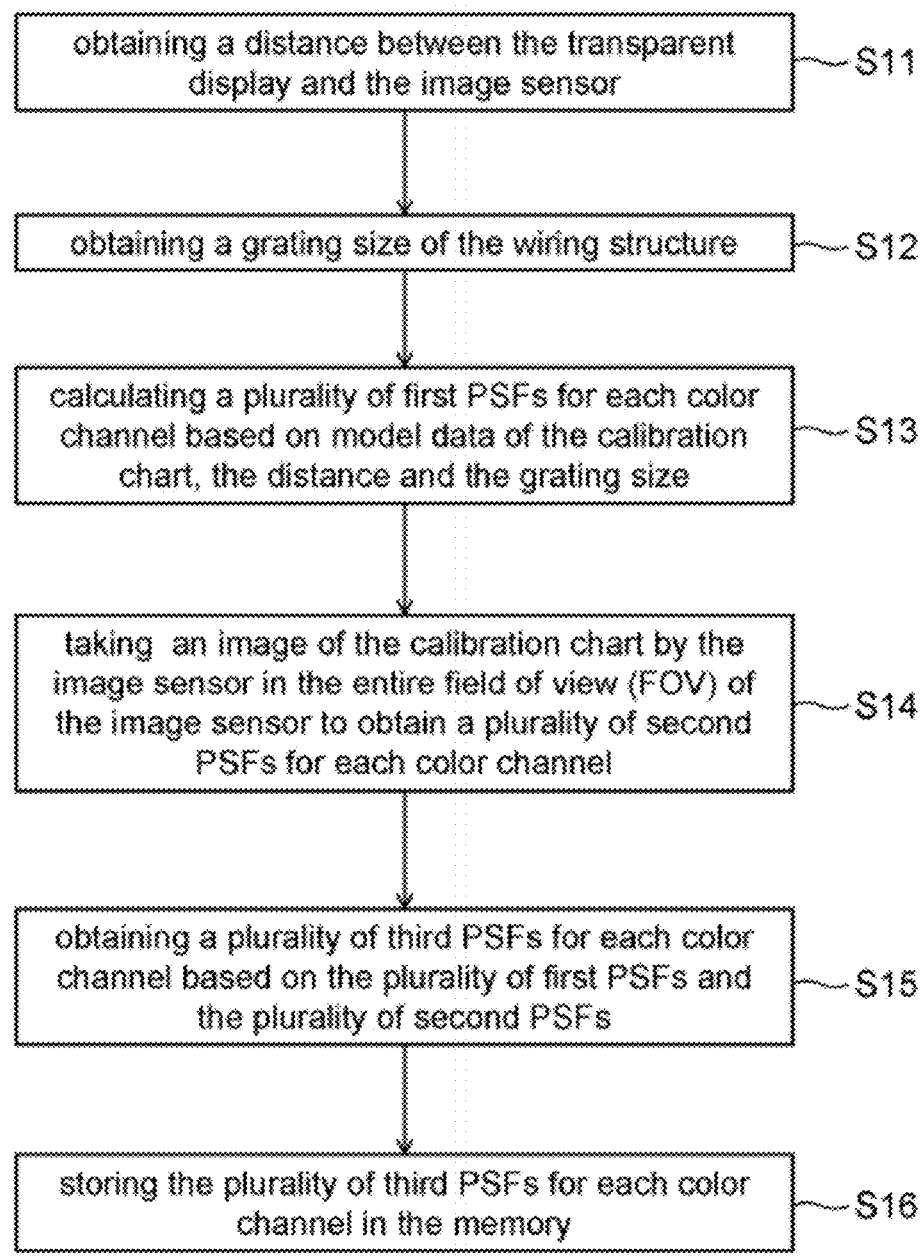
FIG. 8 is a flowchart illustrating an example of a method for estimating a point spread function to be used for recovering an image.

A method for estimating of a point spread function for recovering an image taken by the image sensor 6 is described with reference to a flowchart in FIG. 8. In this example, the method includes the following processes.

In S11, a distance R between the transparent display 2 and the image sensor 6 is obtained from the memory 20. The distance R is shown in FIG. 1c and may be a design value or a value based on measurement such as an average value.

In S12, a grating size is obtained from the memory 20. The grating size gives an aperture function of the Fresnel diffraction. The grating size may be a design value or a value based on measurement such as an average value. For example, 35 um×90 um is obtained as a grating size.

In S13, a plurality of first point spread functions for each color channel (i.e. Red channel, Green channel, and Blue channel) are calculated based on model data of the calibration chart, the distance and the grating size. Each of the first point spread functions corresponds to each of the dots on the calibration chart in one-to-one correspondence. In some embodiment, the first point spread functions may be normalized. The sum of all elements in a PSF matrix is 1 by a normalizing the PSF.

Specifically, the first point spread function u(x', y') is calculated by the following equation (2).

$$u(x', y') = \frac{A}{i\lambda} \int\int \frac{f(x, y)}{R} e^{ik\sqrt{R^2+(x-x')^2+(y-y')^2}} dxdy \quad (2)$$

Here, A: amplitude of light, i: imaginary unit, λ: wavelength of light, f: aperture function derived from the grating size obtained in S12, R: the distance obtained in S11, k: wave number of light.

Figure 9:
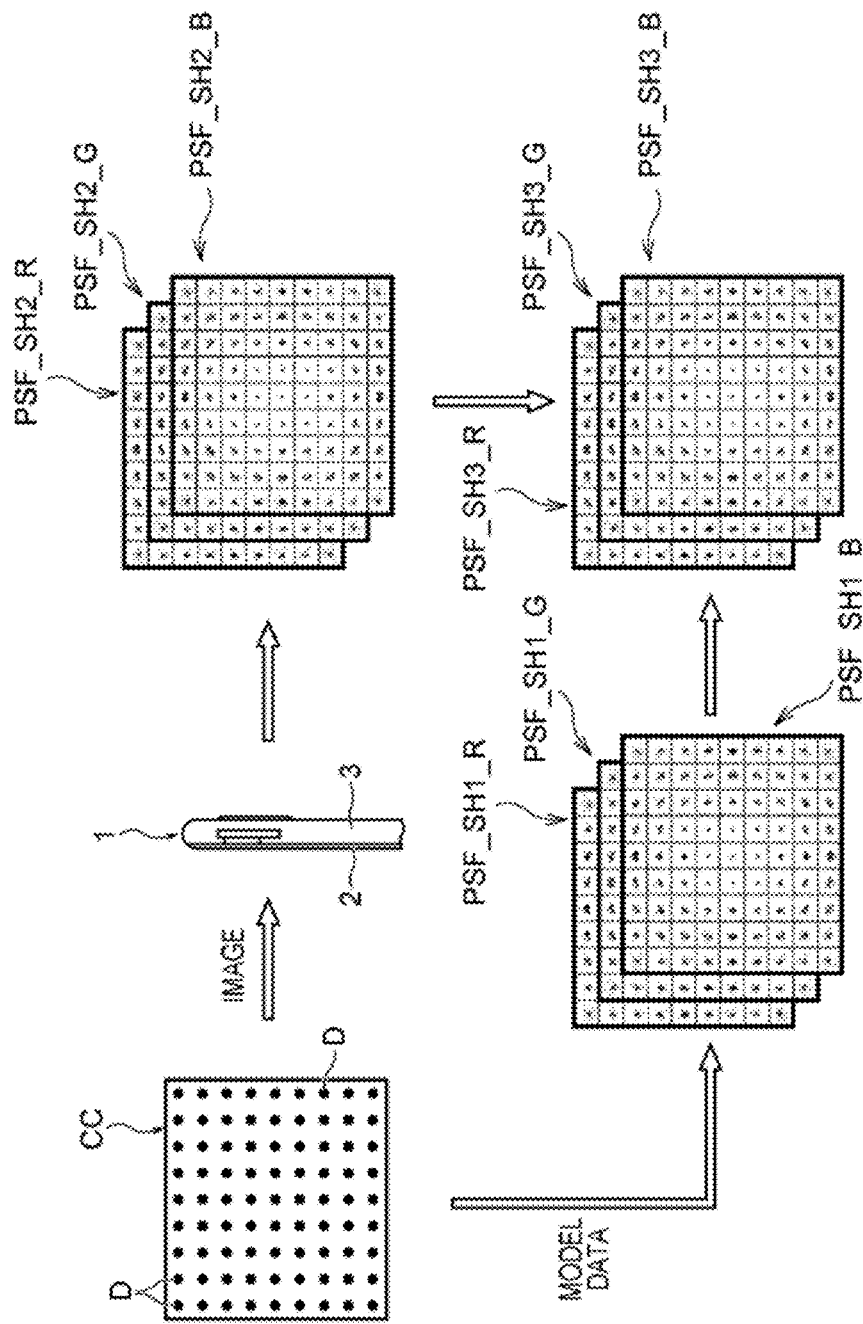
FIG. 9 shows a conceptual flow diagram for obtaining PSF sheet data for each color channel.

As shown in FIG. 9, three PSF sheet data are obtained by performing S13. That is, a PSF sheet data PSF_SH1_R, a PSF sheet data PSF_SH1_G and a PSF sheet data PSF_SH1_B are obtained. Here, the PSF sheet data PSF_SH1_R is a PSF sheet data for Red channel, the PSF sheet data PSF_SH1_G is a PSF sheet data for Green channel, and the PSF sheet data PSF_SH1_B is a PSF sheet data for Blue channel.

Figure 10:
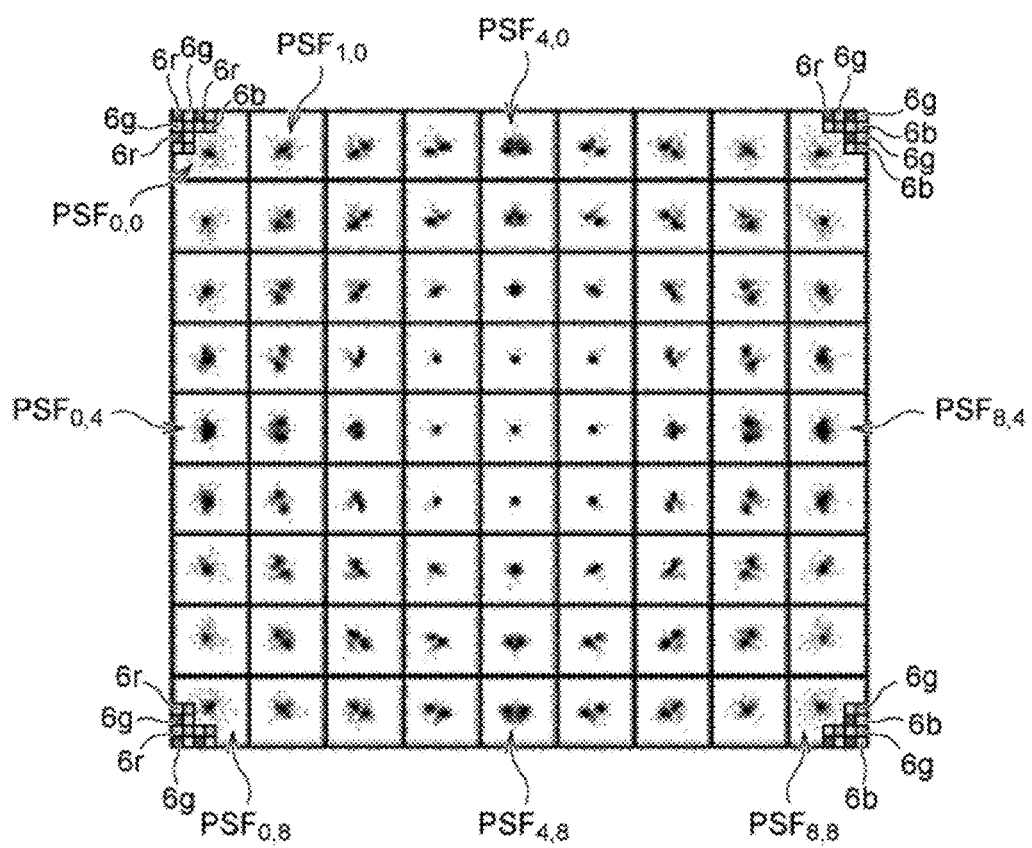
FIG. 10 shows the correspondence between the PSF sheet data and pixels of the image sensor.

In S14, as shown in FIG. 9, an image of the calibration chart CC is taken by the image sensor 6 to obtain a plurality of second point spread functions for each color channel. Specifically, as shown in FIG. 10, the image is taken in the entire field of view (FOV) of the image sensor 6, thereby obtaining the second plurality of second point spread functions. FIG. 10 shows the correspondence between the PSF sheet data and pixels 6r, 6g, 6b of the image sensor 6. The pixels 6r, 6g, 6b are illustrated only at the corner in FIG. 10.

For example, an image taken by the pixels 6r makes the second PSFs for Red channel. Similarly, an image taken by the pixels 6g makes the second PSFs for Green channel, an image taken by the pixels 6b makes the second PSFs for Blue channel. In some embodiment, the second point spread functions may be normalized.

As shown in FIG. 9, three PSF sheet data are obtained by performing S14. That is, a PSF sheet data PSF_SH2_R, a PSF sheet data PSF_SH2_G and a PSF sheet data PSF_SH2_B are obtained. Here, the PSF sheet data PSF_SH2_R is a PSF sheet data for Red channel, the PSF sheet data PSF_SH2_G is a PSF sheet data for Green channel, and the PSF sheet data PSF_SH2_B is a PSF sheet data for Blue channel.

In S15, a plurality of third point spread functions for each color channel are obtained based on the plurality of first PSFs and the plurality of second PSFs. For example, each of the third point spread functions is obtained by taking a weighted average or simple average of the first PSF and the second PSF in the same grid.

Alternatively, each of the third point spread functions may be obtained by taking the larger value of the first PSF and the second PSF in the same grid. In this case, the third PSF may be normalized so that the sum of all elements in the third PSF is 1.

As shown in FIG. 9, three PSF sheet data are obtained by performing S15. That is, a PSF sheet data PSF_SH3_R, a PSF sheet data PSF_SH3_G and a PSF sheet data PSF_SH3_B are obtained. Here, the PSF sheet data PSF_SH3_R is a PSF sheet data for Red channel, the PSF sheet data PSF_SH3_G is a PSF sheet data for Green channel, and the PSF sheet data PSF_SH3_B is a PSF sheet data for Blue channel.

In S16, the plurality of third point spread functions obtained in S15 are stored in the memory 20.

Through the above processes, by estimating a PSF with the first PSF based on model data of the calibration chart and the second PSF based on the image of the calibration chart taken by the camera assembly 4, it is possible to estimate a plurality of PSF corresponding to a plurality of dots on the calibration chart with very high accuracy.

It should be noted that the first PSFs or the second PSFs may be stored in the memory 20 without calculating the third PSFs. In this case, the first PSFs or the second PSFs are used for recovering the image.

The PSF estimation described above may be performed once in a factory.

<Method for Recovering an Image>

Figure 11:
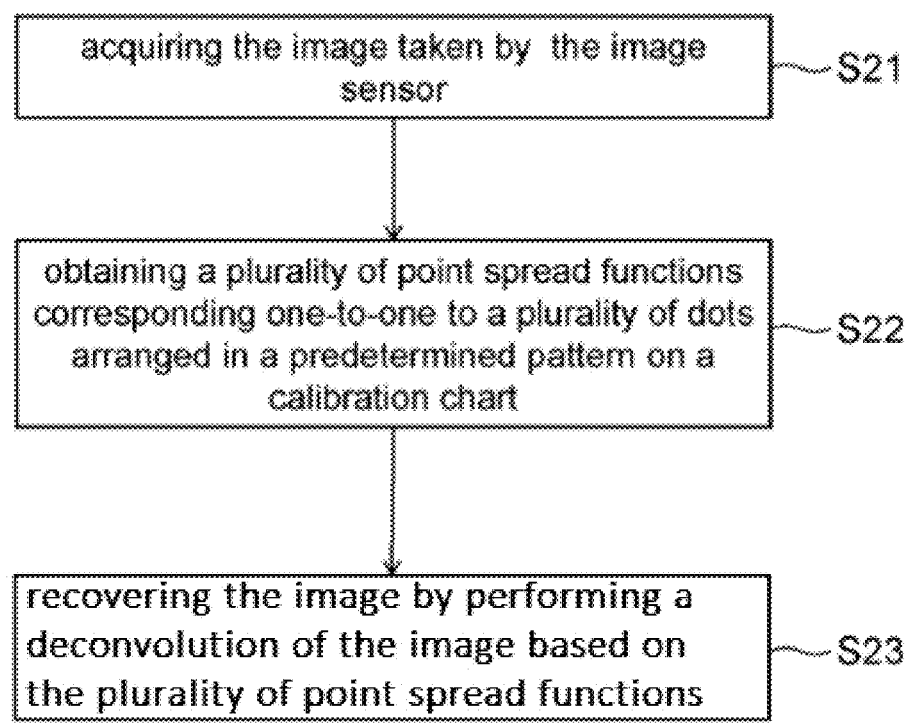
FIG. 11 is a flowchart illustrating an example of a method for recovering an image.
Figure 12:
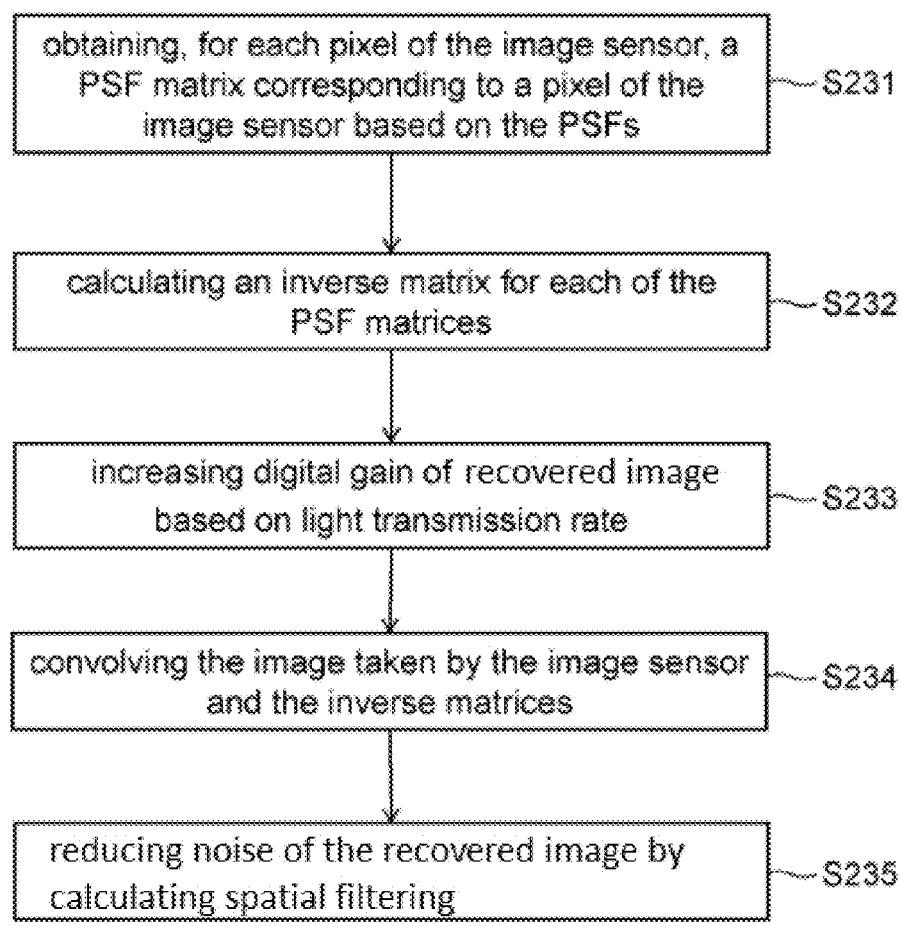
FIG. 12 is a flowchart illustrating an example of a de-convolution process.

A method for recovering an image taken by the image sensor 6 is described with reference to flowcharts in FIGS. 11 and 12. In this example, the method includes the following processes.

In S21, the image is acquired taken by the image sensor 6. The image may be read from the memory 20 or may be acquired directly from the image sensor 6 of the camera assembly 4.

In S22, a plurality of point spread functions corresponding one-to-one to a plurality of dots arranged in a predetermined pattern on a calibration chart are obtained. In the present embodiment, the plurality of third PSFs are read from the memory 20. The first PSFs or the second PSFs may be read from the memory 20 instead of the third PSFs. Anyway, in S22, the plurality of PSFs which have been estimated and stored in the memory 20 in advance are obtained.

In 523, the image is recovered by performing a de-convolution of the image based on the plurality of point spread functions obtained in S22. The de-convolution process is described in detail with reference to a flowchart in FIG. 10.

In S231, a PSF matrix corresponding to a pixel of the image sensor 6 is obtained based on the PSFs obtained in S22. The PSF matrix is obtained for each pixel of the image sensor 6. As one option, the PSF matrix may obtained by selecting a PSF matrix indicating a point spread function nearest to the pixel among the PSFs obtained in S22. An example is explained with reference to FIG. 13.

Figure 13:
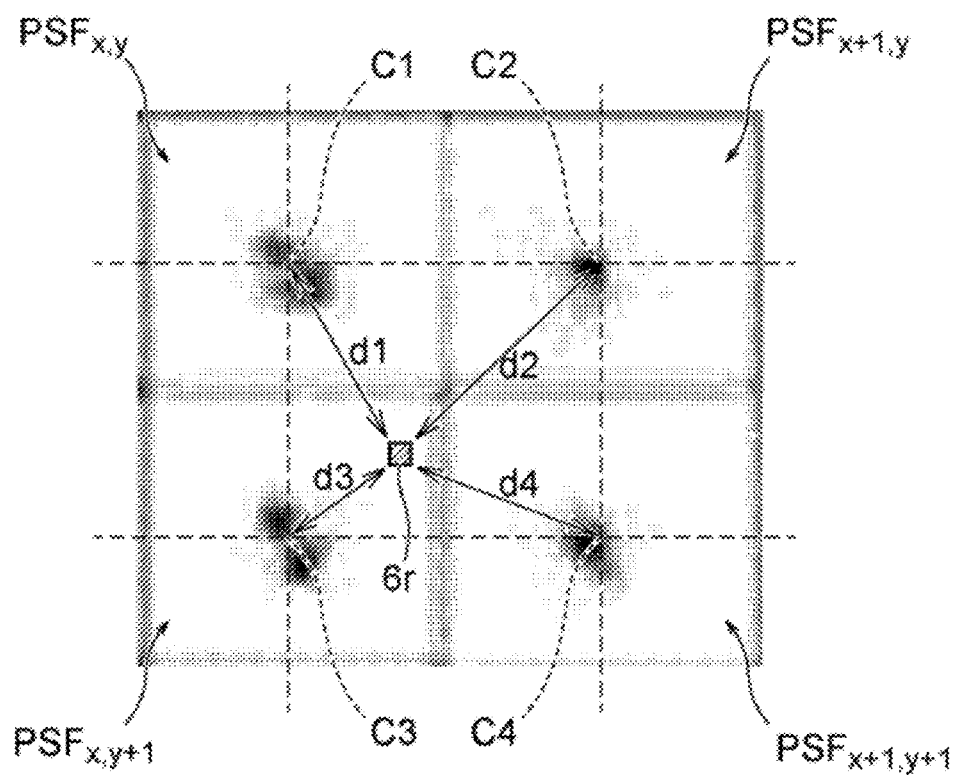
FIG. 13 is a partial enlarged view of FIG. 10 for explaining a method to obtain a PSF matrix corresponding to a pixel.

In FIG. 13, a distance d1 is a distance between a center point C1 of an upper left grid and the pixel 6r. A distance d2 is a distance between a center point C2 of an upper right grid and the pixel 6r. A distance d3 is a distance between a center point C3 of a lower left grid and the pixel 6r. A distance d4 is a distance between a center point C4 of a lower right grid and the pixel 6r. In this case, a matrix representing the $PSF_{x,y+1}$ in the lower left grid is obtained for the pixel 6r because the distance d3 is the shortest.

Alternatively, the PSF matrix may be obtained by interpolation for each pixel of the image sensor 6. Specifically, the PSF matrix may be created by interpolating at least two point spread functions in a vicinity of the pixel among the plurality of point spread functions. In case of FIG. 13, the PSF matrix for the pixel 6r is calculated by the equation (3).

$$PSF = w_1 \cdot PSF_{x,y} + w_2 \cdot PSF_{x+1,y} + w_3 \cdot PSF_{x,y+1} + w_4 \cdot PSF_{x+1,y+1} \quad (3)$$

Here, $w_1$, $w_2$, $w_3$ and $w_4$ are weighting factors, and the sum thereof is 1. The weighting factor is inversely proportional to the distance, for example. If the distances d1, d2, d3 and d4 are equal, each of $w_1$, $w_2$, $w_3$ and $w_4$ is 0.25.

The calculation of the equation (3) is performed by adding the elements of the PSF matrices.

In S232, an inverse matrix is calculated for each of the PSF matrices obtained in S231. The inverse matrix functions as an inverse filter or a de-convolution window.

In S233, digital gain of recovered image is increased based on light transmission rate of the transparent display 2. Specifically, the digital gain is increased as the light transmission rate decreases. The S233 may be performed at any timing before S234.

In S234, the image taken by the image sensor 6 and the inverse matrices calculated in S232 are convolved, thereby recovering quality of the image.

In S235, noise of the recovered image is reduced by calculating spatial filtering. The spatial filtering may be calculated for each color channel. Single filtering or iterative filtering may be used as a filtering method. The S235 may be performed at any timing after S234. It should be note that the S233 and S235 are optional.

Figure 14A:
FIG. 14a shows an example of an image taken by the image sensor.
Figure 14B:
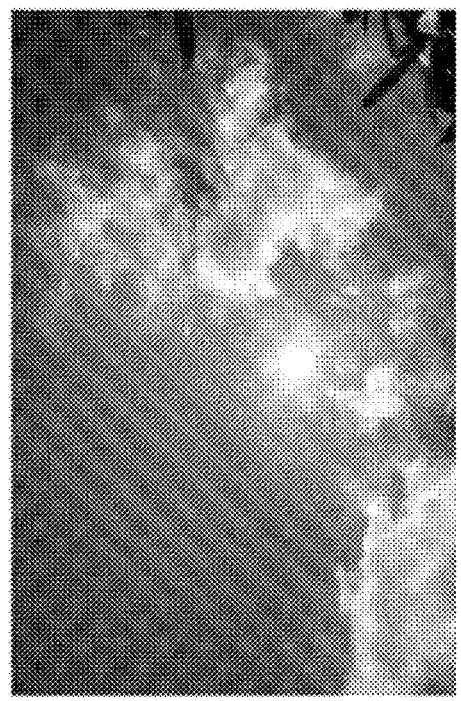
FIG. 14b shows an example of an image recovered by the de-convolution process according to the embodiment.

By performing the image recovering method described above, quality of the image passing through the transparent display 2 can be improved. FIG. 14a shows an example of an image taken by the camera assembly 4. FIG. 14b shows an example of the image recovered by the de-convolution process according to the embodiment. As is clear from FIGS. 14a and 14b, the artifacts due to diffraction at the wiring structure 2b is effectively eliminated.

According to the present disclosure, the camera assembly 4 can be placed anywhere behind the transparent display 2. For example, as shown in FIG. 1a, the camera assembly 4 may be placed in a middle area of the electronic device 1. The camera assembly 4 may be placed at the center of the electronic device 1.

According to the present disclosure, it becomes possible to maximize screen-to-body ratio of the electronic device 1 and to enrich user experience for immersive viewing.

According to the present disclosure, the camera assembly 4 can be mounted behind the transparent display 2 without ugly artifacts caused by the diffraction. This enables to set the camera assembly 4 anywhere behind the transparent display 2, and this makes it possible to take natural eye point selfie without any costly computation.

Figure 15:
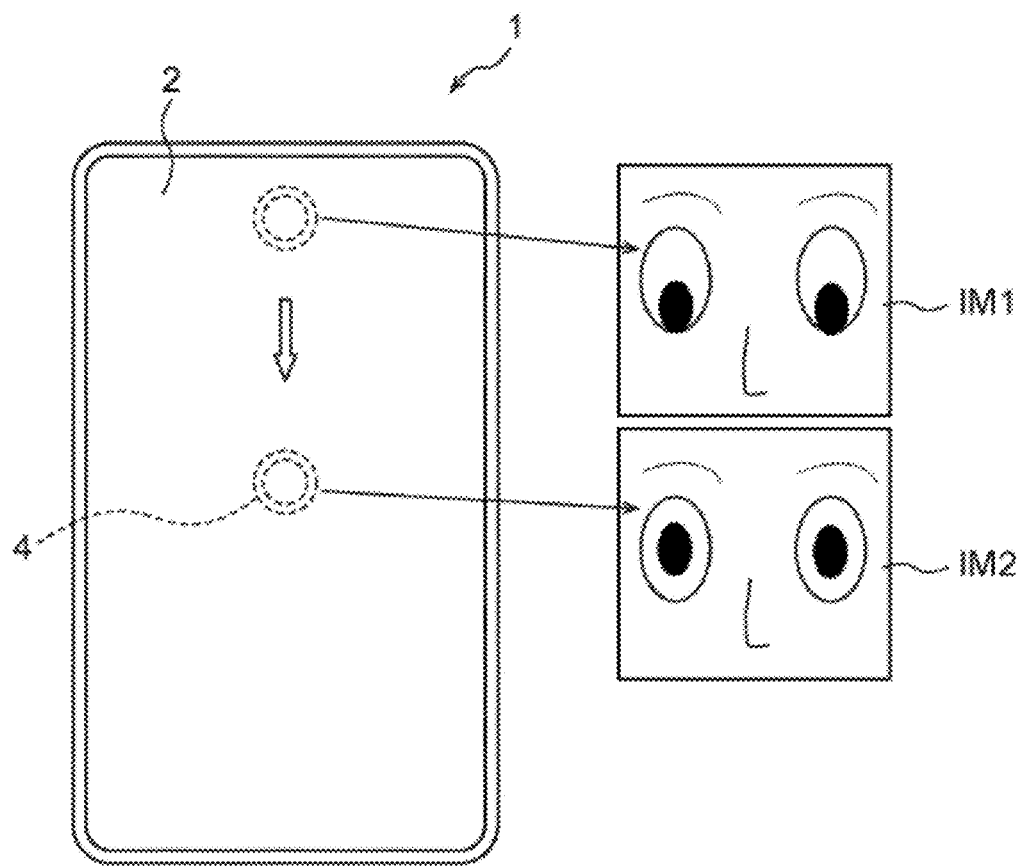
FIG. 15 shows a schematic plan view of an electronic device in the present disclosure.

More specifically, if the camera assembly 4 is mounted in an upper area of the electronic device 1 as in the prior art, the eye point of the selfie image IM1 is not natural as shown in FIG. 15. On the other hand, if the camera assembly 4 is mounted in the middle area of the electronic device 1 as shown in FIG. 15, the eye point of the selfie image IM2 can be natural.

A distance between eye positions of a displayed face and the camera assembly 4 in a case where the camera assembly 4 is placed in the middle area is smaller than that in a case where the camera assembly 4 is placed in the upper area of the electronic device 1. Therefore, user of the electronic device 1 can easily take a selfie image with natural eye point.

Moreover, the electronic device 1 shown in FIG. 15 is a type of a full covered display smartphone. There is no area to allocate the camera assembly 4 on the front surface of the transparent display 2, and thus a wider area for the transparent display 2 can be realized on the front surface of the electronic device 1.

As described above, according to the present disclosure, it is possible to avoid low image quality problem such as blur, brightness loss and/or flare caused by structural circuit layout provided with the transparent display.

Further, according to the present disclosure, it is possible to leverage a front-facing camera without sacrificing any user experience for selfie or video chatting etc.

It should be noted that the electronic device in the present disclosure is not limited to smartphone, but it can be other devices with display and front-facing camera.

In the description of embodiments of the present disclosure, it is to be understood that terms such as "central," "longitudinal", "transverse", "length," "width," "thickness," "upper," "lower," "front," "rear," "left," "right," "vertical," "horizontal," "top," "bottom," "inner," "outer," "clockwise," and "counterclockwise" should be construed to refer to the orientation or the position as described or as shown in the drawings under discussion. These relative terms are only used to simplify description of the present disclosure, and do not indicate or imply that the device or element referred to must have a particular orientation, or constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the description of embodiments of the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the above description to implement different structures of the present disclosure. In order to simplify the present disclosure, certain elements and settings are described in the above. However, these elements and settings are only by way of example and are not intended to limit the present disclosure. In addition, reference numbers and/or reference letters may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment" "some embodiments" "an exemplary embodiment," "an example," "a specific example" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although embodiments of the present disclosure have been shown and described, it would be appreciated by those skilled in the art that the embodiments are explanatory and cannot be construed to limit the present disclosure, and changes, modifications, alternatives and variations can be made in the embodiments without departing from the scope of the present disclosure.

What is claimed is:

1. A method for recovering an image passing through a display and taken by an image sensor disposed on a rear side of the display, the method comprising:
   acquiring the image taken by the image sensor;
   obtaining a plurality of point spread functions corresponding one-to-one to a plurality of dots arranged in a predetermined pattern on a calibration chart; and
   recovering the image by performing a de-convolution of the image based on the plurality of point spread functions.

2. The method according to claim 1, wherein the recovering the image by performing the de-convolution of the image based on the plurality of point spread functions to comprises:
   obtaining, for each pixel of the image sensor, a PSF matrix corresponding to a pixel of the image sensor based on the plurality of point spread functions;
   calculating an inverse matrix for each of the obtained PSF matrices; and
   convolving the image taken by the image sensor and the inverse matrices.

3. The method according to claim 2, wherein the obtaining, for each pixel of the image sensor, the PSF matrix corresponding to the pixel of the image sensor based on the plurality of point spread functions comprising:
   selecting, for each pixel of the image sensor, a PSF matrix indicating a point spread function nearest to the pixel among the plurality of point spread functions.

4. The method according to claim 2, wherein the obtaining, for each pixel of the image sensor, the PSF matrix corresponding to a pixel of the image sensor based on the plurality of point spread functions comprising:
   creating, for each pixel of the image sensor, a PSF matrix by interpolating at least two point spread functions in a vicinity of the pixel among the plurality of point spread functions.

5. The method according to claim 1, wherein the display has a wiring structure formed in a lattice shape, and
   a distance between the display and the image sensor, a size of a substantially rectangular opening of the wiring structure, and a wavelength of light passing through the display meet a condition of Fresnel diffraction.

6. The method according to claim 5, wherein the distance is between 0.5 mm and 7.5 mm, a length of one side of the opening is between 10 um and 200 um, and the wavelength is a wavelength of visible light.

7. The method according to claim 1, wherein the plurality of point spread functions are obtained for each of a plurality of color channels.

8. The method according to claim 7, wherein the plurality of color channels include Red channel, Green channel and Blue channel.

9. The method according to claim 1, wherein in response to the recovering the image by performing a de-convolution of the image based on the plurality of point spread functions, the method further comprises:
   reducing noise of the recovered image by calculating spatial filtering.

10. The method according to claim 1, further comprising:
    prior to the recovering the image by performing the de-convolution of the image based on the plurality of point spread functions, increasing digital gain of recovered image based on a light transmission rate of the display.

11. The method according to claim 1, further comprising:
    prior to the obtaining the plurality of point spread functions corresponding one-to-one to the plurality of dots arranged in the predetermined pattern on the calibration chart:
    obtaining a distance between the display and the image sensor;
    obtaining a grating size of a wiring structure; and
    calculating a plurality of first point spread functions for each color channel based on model data of the calibration chart, the distance and the grating size.

12. The method according to claim 11, further comprising:
    obtaining a plurality of second point spread functions for each color channel by taking an image of the calibration chart by the image sensor in the entire field of view (FOV) of the image sensor; and
    obtaining a plurality of third point spread functions for each color channel based on the plurality of first point spread functions and the plurality of second point spread functions.

13. The method according to claim 12, wherein the third point spread function is obtained by taking a weighted or simple average of the first point spread function and the second point spread function in the same grid.

14. The method according to claim 12, wherein the third point spread function is obtained by taking the larger value of the first point spread function and the second point spread function in the same grid.

15. An electronic device comprising:
    a display;
    an image sensor disposed on a rear side of the display;
    a processor; and
    a memory, wherein the processor is configured to recover an image which passes through the display and taken by the image sensor by performing acts of:
    acquiring the image taken by the image sensor;
    obtaining a plurality of point spread functions corresponding one-to-one to a plurality of dots arranged in a predetermined pattern on a calibration chart; and
    recovering the image by performing a de-convolution of the image based on the plurality of point spread functions.

16. The electronic device according to claim 15, wherein the processor is configured to perform a de-convolution of the image based on the plurality of point spread functions to recover the image by performing acts of:
    obtaining, for each pixel of the image sensor, a PSF matrix corresponding to a pixel of the image sensor based on the plurality of point spread functions;
    calculating an inverse matrix for each of the obtained PSF matrices; and convolving the image taken by the image sensor and the inverse matrices.

17. The electronic device according to claim 15, wherein the display has a wiring structure formed in a lattice shape, and
   a distance between the display and the image sensor, a size of a substantially rectangular opening of the wiring structure, and a wavelength of light passing through the display meet a condition of Fresnel diffraction.

18. The electronic device according to claim 17, wherein the distance is between 0.5 mm and 7.5 mm, a length of one side of the opening is between 10 um and 200 um, and the wavelength is a wavelength of visible light.

19. A non-transitory computer-readable storage medium, having instructions stored thereon that, when executed by a processor, cause the processor to implement a method for recovering an image passing through a display and taken by an image sensor disposed on a rear side of the display, the method comprising:
   acquiring the image taken by the image sensor;
   obtaining a plurality of point spread functions corresponding one-to-one to a plurality of dots arranged in a predetermined pattern on a calibration chart; and
   recovering the image by performing a de-convolution of the image based on the plurality of point spread functions.

20. The non-transitory computer-readable storage medium according to claim 19, wherein the recovering the image by performing the de-convolution of the image based on the plurality of point spread functions to comprises:
   obtaining, for each pixel of the image sensor, a PSF matrix corresponding to a pixel of the image sensor based on the plurality of point spread functions;
   calculating an inverse matrix for each of the obtained PSF matrices; and
   convolving the image taken by the image sensor and the inverse matrices.

* * * * *